United States Patent [19]

Watanabe

[11] Patent Number: 4,508,064
[45] Date of Patent: Apr. 2, 1985

[54] INTERNAL COMBUSTION ENGINE OF HYDROGEN GAS

[75] Inventor: Kenji Watanabe, Kagoshima, Japan

[73] Assignee: Katsuji BABA, Kagoshima, Japan; a part interest

[21] Appl. No.: 425,915

[22] Filed: Sep. 28, 1982

[30] Foreign Application Priority Data

| Nov. 12, 1981 [JP] | Japan | 56-180409 |
| Feb. 3, 1982 [JP] | Japan | 57-14819 |
| Feb. 3, 1982 [JP] | Japan | 57-14820 |

[51] Int. Cl.$^3$ ............................................. F02B 75/12
[52] U.S. Cl. ............................ 123/1 A; 123/DIG. 12; 123/525
[58] Field of Search ............ 123/1 A, DIG. 12, 25 R, 123/25 A, 25 D, 25 P, 525

[56] References Cited

U.S. PATENT DOCUMENTS

| 2,183,674 | 12/1939 | Erren | 123/1 A |
| 3,696,795 | 10/1972 | Smith et al. | 123/DIG. 12 |
| 3,983,882 | 10/1976 | Billings | 123/DIG. 12 |
| 4,178,882 | 12/1979 | Anderson et al. | 123/DIG. 12 |

FOREIGN PATENT DOCUMENTS

| 231000 | 3/1925 | United Kingdom | 123/27 G |
| 2059501 | 4/1981 | United Kingdom | 123/25 D |

Primary Examiner—E. Rollins Cross
Attorney, Agent, or Firm—Frishauf, Holtz, Goodman & Woodward

[57] ABSTRACT

A hydrogen gas internal combustion engine provided with a hydrogen gas jet nozzle and water spray jet nozzle in the combustion chamber to directly jet hydrogen gas and the water spray therein. The sprayed water is instantly vaporized to steam by igniting the hydrogen gas thereby utilizing the combustion/explosion energy of the hydrogen gas and the steam energy generated from the vaporization of the steam in a combination to obtain mechanical dynamic energy.

7 Claims, 6 Drawing Figures

1

INTERNAL COMBUSTION ENGINE OF HYDROGEN GAS

BACKGROUND OF THE INVENTION

This invention relates to an internal combustion engine which uses hydrogen gas as the fuel for thermal energy source and is capable of effectively converting the explosive energy generated by the combustion of hydrogen gas into mechanical kinetic energy.

As is well known in the art, since hydrogen gas engines are more advantageous than gasoline engines in that they have a better mileage and cause less pollution, various tests products have been manufactured. Test engines so far manufactured are, however, mostly far less practical in terms of output, engine configuration and weight, economy, etc. when compared with conventional type engines of petroleum fuels, and the development therefor has come to a deadlock.

The fundamental reason why these trial hydrogen engines have not yet reached the stage of practical use is that all these attempts were made to directly convert the combustion/explosion energy of hydrogen gas into mechanical kinetic energy as is done in conventional gasoline engines.

When hydrogen gas is viewed as a fuel for obtaining mechanical dynamic energy, its combustion rate is by far the greater than that of gasoline, and as a result the conversion of its combustion/explosion energy into mechanical dynamic energy becomes very low. The unconverted thermal energy which remains in the combustion chamber becomes accumulated and causes abnormal temperature rises in the parts which constitute the combustion chamber and adjacent parts thereof. This in turn hampers a smooth supply of hydrogen gas into the combustion chamber and the timely ignition as required, whereby proper engine driving becomes impossible.

Actual problems encountered in an internal combustion engine using hydrogen gas as the fuel is that although during idling when the fuel supply is limited, the engine can be kept running by a mixture diluted with the air, and a high load operation with an increased fuel supply will cause the premature ignition due to the increase in the hydrogen concentration. Thus, back fires and knocking are easily caused and the pressure is rapidly increased.

In order to overcome this problem, Billings and Daimler-Benz have proposed to supply hydrogen gas which is mixed with the water into the combustion chamber in order to lower the temperature of the combustion gas as well as the temperature of overheated parts. Previous attempts of this sort have succeeded in preventing the back fires and knocking to a certain extent. But since they must limit the maximum output to about 60% of the output obtained by gasoline engines in order to reduce the heat capacity produced by combustion and to prevent abnormal combustion, the output capacity cannot be sufficiently increased.

An object of the present invention is to overcome the problems heretofore encountered in hydrogen gas engines and to provide a feasible engine which is capable of increasing the efficiency in converting the combustion/explosion energy of hydrogen gas into mechanical dynamic energy and which can be put into practical use.

Another object of the present invention is to provide a hydrogen gas engine capable of preventing premature ignition, back fires and knocking even under a high load operation by restricting the thermal energy generated by the combustion and explosion of hydrogen gas by means of the water spray introduced into the combustion chamber concurrently with the gas supply.

Still another object of the invention is to provide a hydrogen gas engine with a higher efficiency in conversion of energy into mechanical dynamic energy by vaporizing the water spray which has been introduced in the combustion chamber into steam by the heat of combusting hydrogen gas and utilizing the effect of combined forces of hydrogen gas and the steam.

Yet another object of the present invention is to provide a hydrogen gas engine capable of a smooth operation both under the high and low loads by means of separate channels, each of which supplying hdyrogen gas in an amount suitable for either the high or low load operation respectively.

SUMMARY OF THE INVENTION

The hydrogen gas engine according to the present invention is characterized in that hydrogen gas and the water supply are not mixed in advance but are directly introduced into the combustion chamber via separate nozzles. Hydrogen gas and the water spray are jetted into the combustion chamber simultaneously or at slightly staggered timings. As the compressed hydrogen gas is ignited by the ignition plug in the combustion chamber, the thermal energy by the combustion of hydrogen gas is directly converted into mechanical dynamic energy. At the same time, a portion of the thermal energy causes the water spray in the combustion chamber to instantly vaporize into steam, whereby explosive thermal energy of hydrogen gas and steam will become combined and converted into mechanical dynamic energy.

Whereas the combustion rate of hydrogen gas itself is high in the hydrogen gas engine of the present invention, the rate at which the water spray vaporizes by the combustion of the gas is relatively slower than the combustion rate of gasoline engines, explosion/combustion of hydrogen gas and vaporization of the water spray take place in the same combustion chamber as a series of related actions. As a result, the conversion of these energies into mechanical dynamic energy may take place in a manner similar to that in gasoline engines. The hydrogen gas engine according to the present invention is thus made capable of effectively utilizing the thermal energy of hydrogen gas which has otherwise been exhausted when hydrogen gas alone was subjected to combustion, and increasing the resultant mechanical dynamic energy.

Further, as the water to be supplied in the combustion chamber together with hydrogen gas is not pre-mixed with the gas, but is directly and separately supplied in the form of spray, the spray gives rise to steam energy in the combustion chamber which is maintained at a high temperature and pressure because of the quickly burning hydrogen gas. The steam helps to improve the conversion rate of thermal energy of hydrogen gas combustion into mechanical dynamic energy. The supply of the water spray also acts to reduce the thermal energy which remains unconverted in the combustion chamber, so that the temperature rise in the parts constituting the chamber and adjacent parts can be restricted. The hydrogen gas engine according to the present invention is thus advantageous in its smooth supply of hydrogen gas into the combustion chamber and the timely ignition.

DETAILED DESCRIPTION OF THE INVENTION

Figure 1:
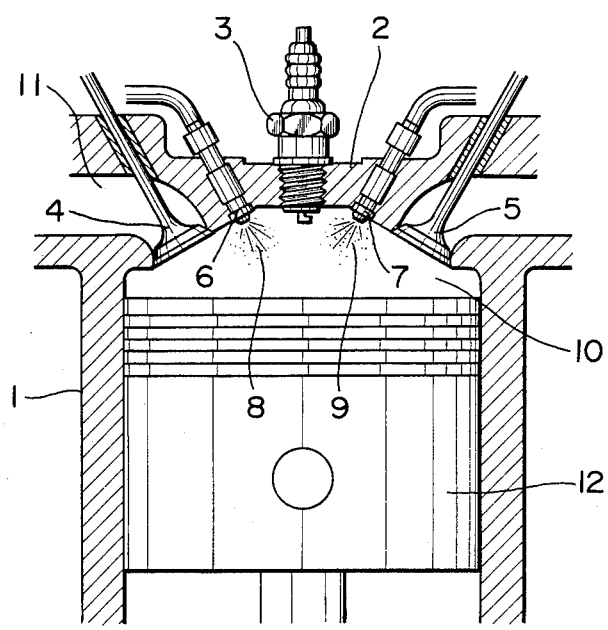
FIG. 1 is a sectional view of the cylinder of a piston type reciprocating engine to which the hydrogen gas engine of the present invention is applied.

FIG. 1 shows a sectional view of the cylinder in a reciprocating engine to which the present invention applied. As is shown, the cylinder 1 has a cylinder head 2 which is provided with an ignition plug 3, an inlet valve 4 and an exhaust valve 5 together with a nozzle 6 for pressurized jetting of hydrogen gas and a nozzle 7 for spraying the water that are provided respectively for supplying the hydrogen gas 8 and the water spray 9 into the combustion chamber 10. The nozzles 6 for pressurized jetting of the hydrogen gas and the water spraying nozzle 7 jet the hydrogen gas 8 and the water spray 9 into the combustion chamber 10 from respective sources (not shown) either simultaneously or at slightly staggered timings.

Hydrogen gas 8 and the water spray 9 are fed during the compression stroke as in the ordinary gasoline engines where a piston 12 moves upward and the inlet valve 4 and the exhaust valve 5 are both closed. Jetting is respectively cut off just before the piston 12 reaches the upper dead end, when the compressed hydrogen gas is ignited by the ignition plug 3. The thermal energy generated by combustion of ignited hydrogen gas is directly converted into mechanical dynamic energy. At the same time, the water spray is converted into steam instantly in the combustion chamber which is maintained at a high temperature and pressure due to the quickly burning hydrogen gas, whereby explosive thermal energy of hydrogen gas and steam energy are combined and become a mechanically dynamic energy to press down the piston 12. The exhaust strokes and the inlet strokes following said explosion strokes are the same as those in the ordinary gasoline engine.

Figure 2:
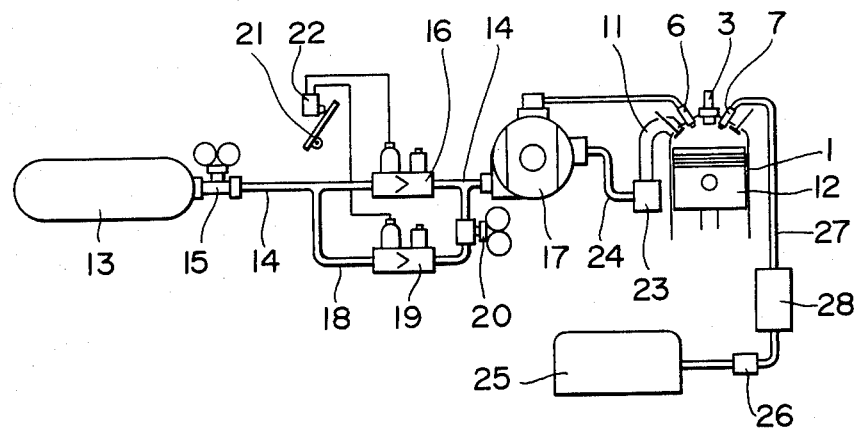
FIG. 2 shows the fuel supply system of the hydrogen gas engine shown in FIG. 1.

FIG. 2 shows the fuel supply system of an automobile engine of reciprocating type to which the present hydrogen gas engine is applied. Hydrogen gas 8 is pressurized and directly jetted into the cylinder 1 from a container 13 via a gas supply channel 14 without passing a carburetor 23. The channel 14 supplies hydrogen gas at a pressure of about 5 kgf/cm² by means of a pressure control means 15 provided at the mouth of the container 13. There are provided at an intermediate point in the channel a check valve 16 and a regulator 17 which reduce the pressure and regulate the flow rate. Hydrogen gas passes through the regulator 17 and flows at a low pressure of about 0.5 kgf/cm² into the nozzle 6 for pressurized jetting. The nozzle 6 pressurizes and jets the gas at a predetermined pressure into the cylinder 1. The channel 14 is provided on both sides of the check valve 16 with a by-pass 18 which supplies low pressure gas during a low load operation and which by-passes the check valve 16. The by-pass 18 is provided with a check valve 19 and a pressure control means 20; the pressure control means 20 lowers the pressure of hydrogen gas sent from the container 13 from about 5 kgf/cm² to about 0.1 kgf/cm². Hydrogen gas thus lowered in the pressure to about 0.1 kgf/cm² is sent to the regulator 17 via the by-pass 18 during a low load operation such as idling, when a limit switch 22 provided at an accel pedal 21 closes as the pedal is released and causes the check valve 19 to open on the by-pass 18 and at the same time, it also causes the check valve 16 on the supply channel 14 to close. Since the predetermined pressure set at the regulator 17 is greater than the pressure at which the gas flows in from the by-pass 18, said gas at a low pressure of about 0.1 kgf/cm² proceeds intact to the nozzle 6 for pressurizing and jetting the gas, where the gas is pressurized to the predetermined pressure and jetted into the cylinder 1.

When the accel pedal is stepped on to bring about a high load operation, said switch 22 opens to cause the check valve 19 on the by-pass 18 to close and the check valve 16 on the supply channel 14 to open at the same time, whereby the gas from the container 13 is sent to the regulator 17 to be pressurized to about 0.5 kgf/cm² and sent to the nozzle 6 where the gas is further pressurized to the predetermined value before being fed into the cylinder 1.

The amount of gas 8 to be supplied in accordance with the changes in the rate of engine rotation can be controlled by adjusting the flow rate at the regulator 17 by means of a vacuum pipe 24 connecting a carburetor 23 and the regulator 17 in accordance with the degree of opening the throttle valve of the carburetor 23.

As is described above, by providing the by-pass 18 which can supply hydrogen gas at a pressure lower than the predetermined pressure and suitable for a low load operation into the supply channel 14, a high load operation which is effected by means of said supply channel 14 can be made smoothly, and moreover, a low load operation such as idling can also be maintained smooth without trouble by supplying low pressure gas via the said by-pass 18. Experiments using a reciprocating engine with 1800 cc capacity and a rotary engine of commercial automobiles proved that application of the present invention could ensure a smooth operation not only during a low speed running but also during a higher speed running of up to 120 kg/h.

The water spray 9 to be sprayed into the cylinder 1 together with hydrogen gas 8 is supplied from a tank 25 (at ambient temperature; i.e., "room" or "normal" temperature) via a pipe 27 provided with a feed pump 26 by regulating the supply amount in correspondence with the changing rate of engine rotation by means of a spray pump 28 which is controlled in accordance with the engine rotation.

Figure 3:
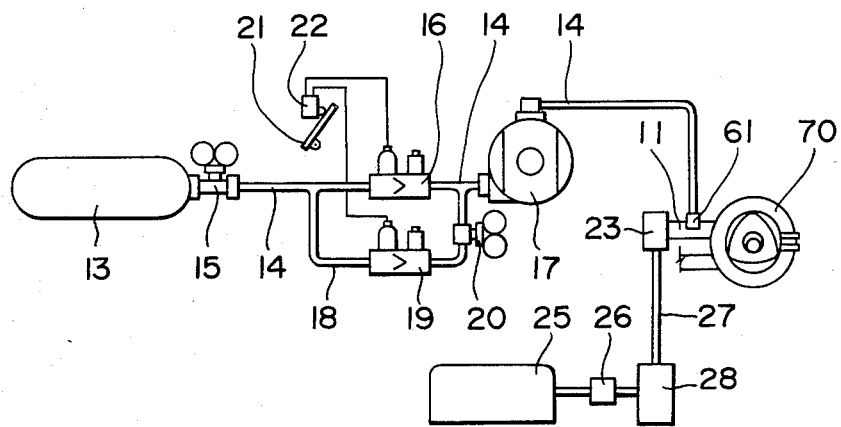
FIG. 3 shows the fuel supply system of a rotary engine to which the hydrogen gas engine of the present invention is applied.

FIG. 3 shows the fuel supply system of a rotary engine to which the present invention is applied. In this case, the supply system for hydrogen gas 8 is identical with said reciprocating engine mentioned above, but the supply system for the water spray is somewhat different. In the rotary engine, the water is supplied from the tank 25 to the carburetor 23 via a feed pump 26, and said carburetor 23 atomizes and sprays the water into a rotor housing 70 via the inlet port 11 together with the air. On the other hand, hydrogen gas 8 is jetted into the inlet port 11 via a nozzle 61 provided on the inlet port 11. It should be noted that the hydrogen gas 8 and the water spray 9 are introduced into the inlet port 11 via separate channels. In other words, hydrogen gas 8 is supplied in the inlet port provided at immediate anterior of the rotor housing 70 via a separate channel 14, just before the mixture of the water spray and the air is supplied into the rotor housing 70. This is the fundamental difference of the present invention from the conventional type in which hydrogen gas, the water and the air are mixed in advance before being supplied into the cylinder.

Figure 4:
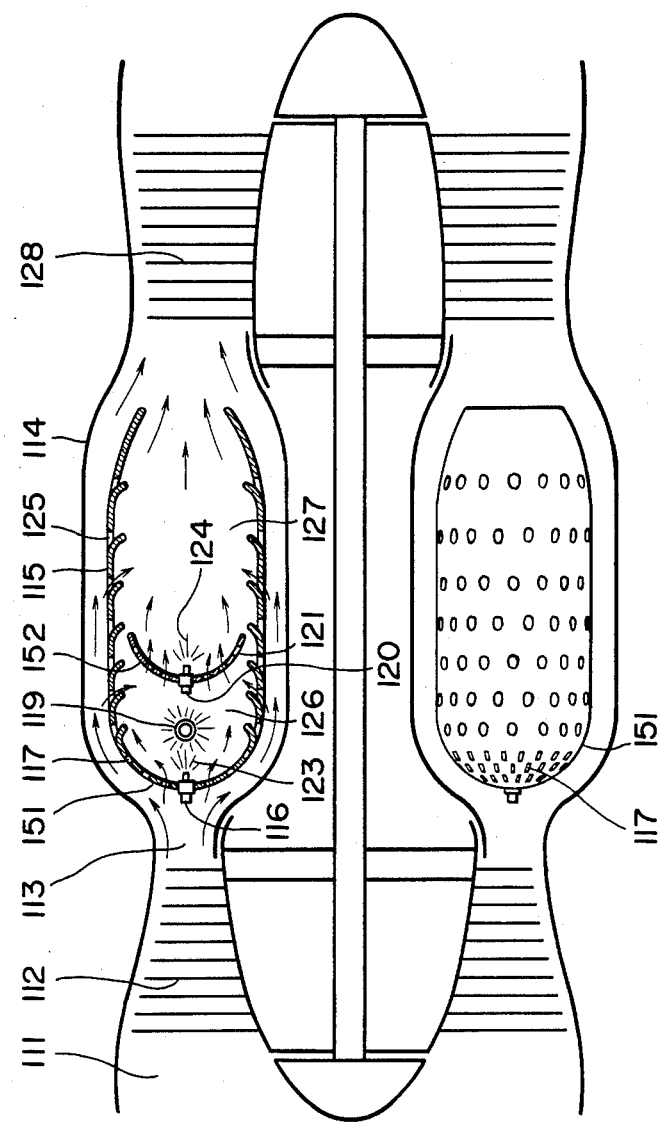
FIG. 4 is a sectional view of a gas turbine to which the hydrogen gas engine of the present invention is applied.
Figure 5:
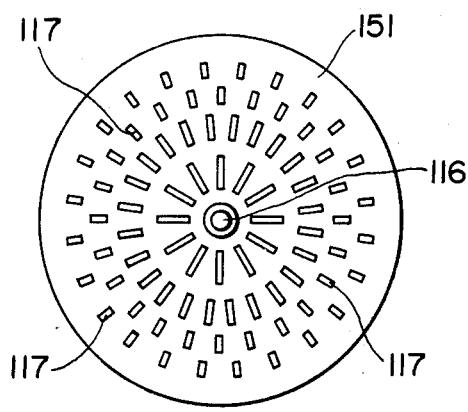
FIG. 5 is a front view of the semi-spherical nozzle cover which constitutes the frontal part of the combustion cylinder.
Figure 6:
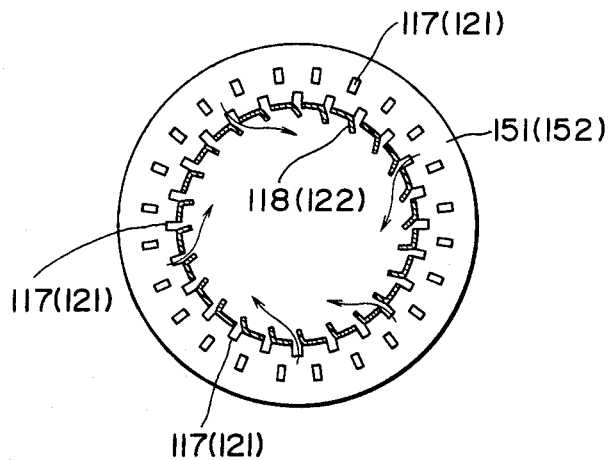
FIG. 6 shows the nozzle cover shown in FIG. 5 sectioned in part.

FIG. 4 shows an embodiment of the present invention using a gas turbine. In the drawing, the reference number 111 represents an air inlet port, 112 a compressor, 113 an inlet port for the pressurized air, 114 a turbine casing, and 115 a combustion cylinder. The tip of the combustion cylinder 115 constitutes a semi-spherical nozzle cover 151. At the center inside a front nozzle cover 151 is provided a nozzle 116 for jetting hydrogen gas. As shown in FIGS. 5 and 6, a plurality of apertures 117 for deflecting and introducing the air are provided around the nozzle 116 for discharging hydrogen gas. These apertures are provided radially from the nozzle 116 and have guide fins 118 therein so that the compressed air around the nozzle cover 151 can be deflected toward its inside when the said air is introduced into the combustion cylinder 115.

An ignition plug 119 is provided behind the nozzle 116 for hydrogen gas, and a rear nozzle cover 152 which is semi-spherical in shape like the front nozzle cover 151 is provided behind the ignition plug 119. The rear nozzle cover 152 is also provided radially about a nozzle 120 for the water spray with a plurality of apertures 121 having guide fins at the inside for deflecting and introducing the combustion gas.

Hydrogen gas 123 and the water spray 124 are jetted from the nozzles 116 and 120 respectively while the air compressed by the compressor 112 is being fed from the turbine casing 114 toward the combustion cylinder 115 via the apertures 117 for deflecting and introducing the air which are provided at the front nozzle cover 151 and via the air holes 125 provided at the side of the combustion cylinder. When the ignition plug 119 placed behind the hydrogen gas nozzle 116 is actuated at this state, hydrogen gas 123 burns continuously at a higher pressure in the front combustion zone 126 located behind the hydrogen gas nozzle 116. At the same time, the water spray 124 is introduced in the zone located behind the rear nozzle cover 152 which is located behind the combustion zone 126 and contacted with combusting hydrogen gas 123 to be vaporized in the rear combustion zone 127 located behind the rear nozzle cover 152. Thus, the combustion energy of hydrogen gas and the steam power of the water spray are combined in the combustion cylinder to continuously produce expansion energy.

In other words, since the compressed air to be introduced in the combustion cylinder 115 is directed rotatingly and spirally toward the inner periphery of the front combustion zone 126 in the cylinder from the apertures 117 (for deflecting and introducing the air) provided at the front nozzle cover 151, a negative pressure zone is formed behind the nozzle 116 in said combustion zone 126 as the center of the vortex. This promotes jetting of hydrogen gas 123 and its diffusion, thereby expanding the area of combustion and improving the inflammability.

The combustion gas produced by the explosion in the front combustion zone 126 enters in vortex into the rear combustion zone 127 through the apertures 121 for guiding the gas on the rear nozzle cover 152 which separates the primary combustion gas and vaporizes the water 124 sprayed into said zone 127. The steam thus produced imparts expansive energy to the combustion gas coming into the rear combustion zone 127 through the apertures 121 on the nozzle cover 152 and from the side of the cover. As for the generation of the steam energy in the rear combustion zone 127, the water spray coming from the nozzle 120 can be effectively diffused and the area where the steam is formed may be expanded as the combustion gas enters in vortex from the apertures 121. The high temperature gas which is caused by a combination of the combustion energy produced in the zone 127 and the steam power due to vaporization of the water is transferred to the rear of the combustion cylinder 115 and is subsequently supplied to a power turbine 128 while being cooled by the air supplied from the air holes 125 at the rear of the said cylinder.

In this turbine which embodies the present invention, the area where the high temperature gas is formed is divided into two parts: the front combustion zone 126 where the combustion gas is produced by hydrogen gas 123; the rear combustion zone 127 where the steam power is produced by the water spray 124 to be contacted with the said combustion gas. This enables supply of the water spray sufficient to produce the steam power in the combustion cylinder 115 which is to be added to the high temperature gas produced by the combustion of hydrogen gas. If the water spray and hydrogen gas are mixed in advance and supplied at the same time, the jet pressure of hydrogen gas would obstruct the water spray in such a way that the particle size of the water spray cannot be reduced sufficiently enough, and thus the steam power which is to impart sufficient expansive force to the combustion gas cannot be generated.

As has been described above, the present invention can effectively convert the combustion/explosion energy of hydrogen gas into mechanical dynamic energy by combining the steam energy, and therefore assures a hydrogen gas engine to be put into practical use as a new power source which has been considered difficult heretofore.

What we claim is:
1. In a hydrogen gas fueled internal combustion engine, the improvement comprising:
   a hydrogen gas jet nozzle provided in a combustion chamber of the engine to directly jet hydrogen gas as fuel into the combustion chamber;
   a source of water at ambient or room temperature; and
   a water spray jet nozzle coupled to said water source, said water spray jet nozzle being provided in said combustion chamber, separately and independently of said hydrogen gas jet nozzle, to directly jet a spray of said ambient or room temperature water into said combustion chamber substantially simultaneously with the jetting in of the hydrogen gas;
   the air in said combustion chamber being compressed so that the water sprayed into said combustion chamber is instantly vaporized to steam by igniting of the hydrogen gas jetted into said combustion chamber, thereby utilizing the combustion/explosion energy of the hydrogen gas and the steam energy generated from the vaporization of the steam in combination to obtain mechanical dynamic energy.

2. The hydrogen gas fueled internal combustion engine of claim 1, wherein said internal combustion engine is a piston-type reciprocating internal combustion engine having at least one cylinder and a cylinder head closing said cylinder, and wherein said hydrogen gas jet nozzle and said water spray jet nozzle are provided in said cylinder head.

3. The hydrogen gas fueled internal combustion engine of claim 1, wherein said internal combustion engine is a rotary engine having a combustion chamber and a rotor rotatably mounted in said combustion chamber, said combustion chamber having an inlet port, said hydrogen gas jet nozzle being provided in said inlet port for introducing hydrogen gas just before the mixture of said water spray and air is introduced into said combustion chamber via said inlet port.

4. The hydrogen gas fueled internal combustion engine of any one of claims 1, 2, or 3, further comprising a hydrogen gas supply channel coupled between a hydrogen gas container and said combustion chamber, said hydrogen gas supply channel including a low pressure hydrogen gas supply by-pass means for closing said hydrogen gas supply channel under low load operating conditions of said engine and for supplying said hydrogen gas to said combustion chamber at a pressure lower than the supply pressure in said hydrogen gas supply channel.

5. The hydrogen gas fueled internal combustion engine of claim 1, wherein said internal combustion engine is a gas turbine engine having a cylinder defining a combustion chamber, the tip of said combustion chamber comprising a semi-spherical front nozzle cover having at its center said hydrogen gas jet nozzle, a rear nozzle cover being arranged inside said combustion chamber and having at its center said water spray jet nozzle, whereby continuous flowing gas in said combustion chamber is combined with steam energy generated by vaporization of the water spray to produce mechanical dynamic energy.

6. The hydrogen gas fueled internal combustion engine of claim 5, wherein said front and rear nozzle covers respectively are provided with apertures arranged radially around the respective nozzles for guiding air, said nozzle covers each further having guide fins for deflecting and dispersing compressed air inside said apertures at a given deflection angle.

7. The hydrogen gas fueled internal combustion engine of claim 7, further comprising a semi-spherical front nozzle cover and a rear nozzle cover arranged in said combustion chamber, said front nozzle cover having said hydrogen gas jet nozzle mounted thereto and said rear nozzle cover having said water spray jet nozzle mounted thereto, said nozzle covers respectively being provided with apertures arranged radially around the respective nozzles for guiding air, and said nozzle covers each further having guide fins for deflecting and dispersing compressed air inside said apertures at a given deflection angle.

* * * * *

UNITED STATES PATENT AND TRADEMARK OFFICE
CERTIFICATE OF CORRECTION

PATENT NO. : 4,508,064

DATED : April 2, 1985

INVENTOR(S) : Kenji WATANABE

It is certified that error appears in the above-identified patent and that said Letters Patent is hereby corrected as shown below:

COLUMN 8 (claim 7), line 21, change "claim 7" to

--claim 1--.

Signed and Sealed this

Third Day of September 1985

[SEAL]

Attest:

DONALD J. QUIGG

Attesting Officer  Acting Commissioner of Patents and Trademarks - Designate